June 1, 1943.     J. E. BROSSEAU ET AL     2,320,347
CONTROL DEVICE
Filed March 17, 1941     3 Sheets-Sheet 3
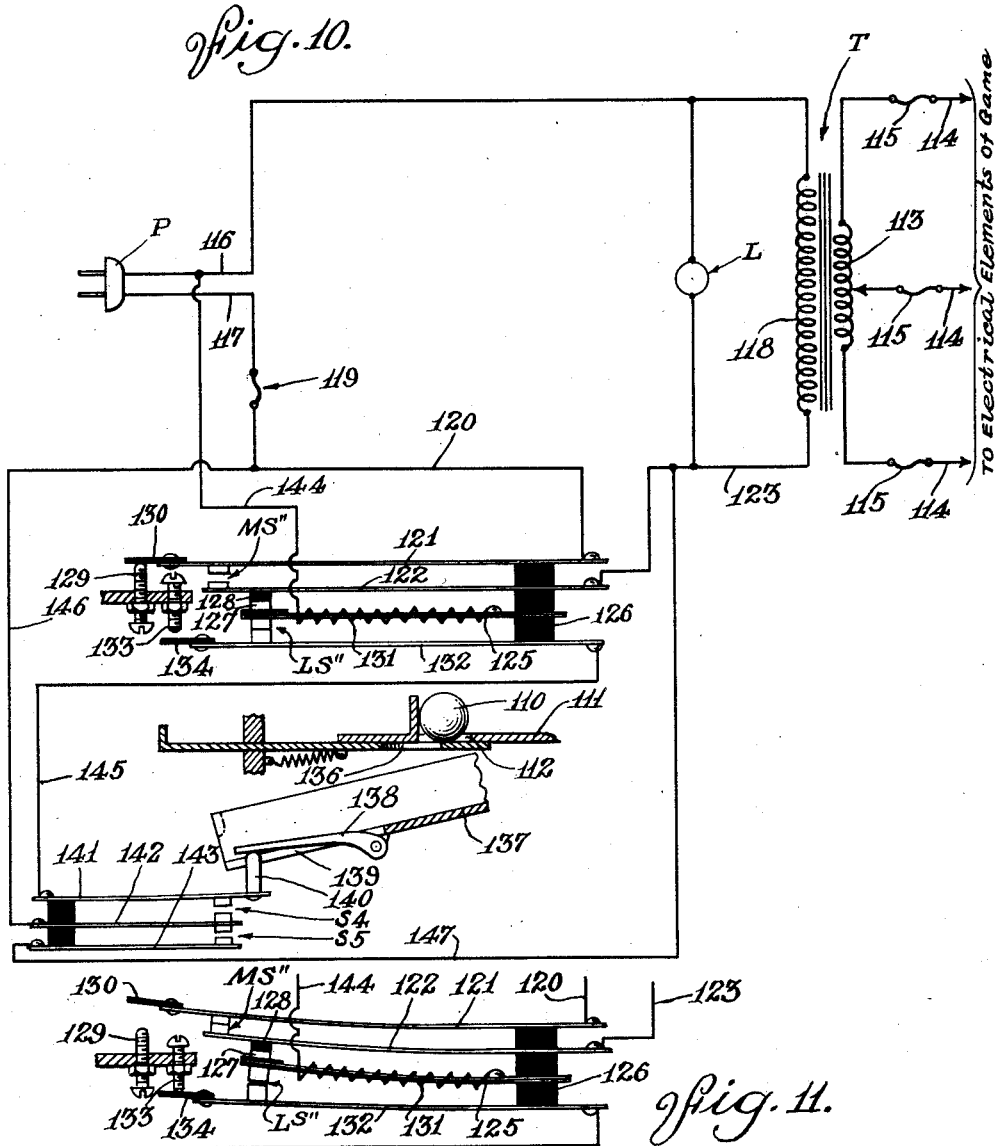
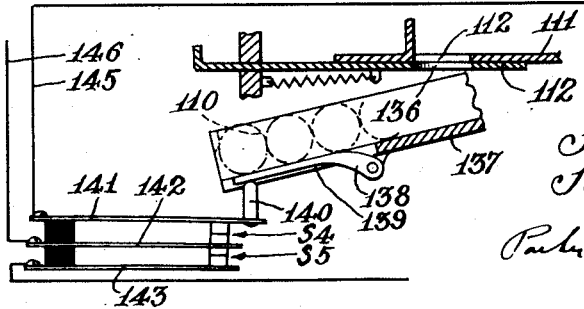
INVENTORS
Joseph E. Brosseau
John B. Brosseau
BY
ATTORNEYS.

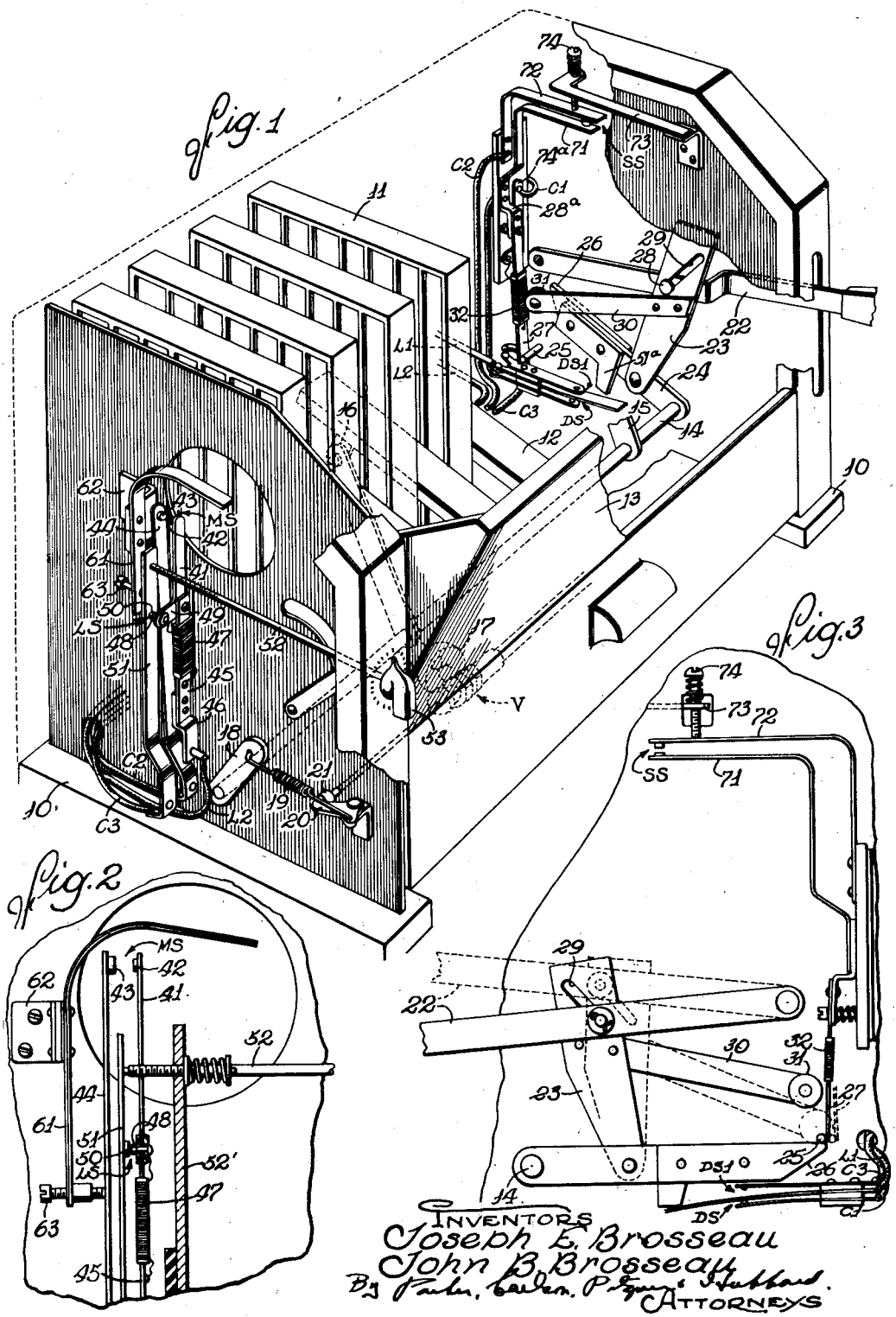

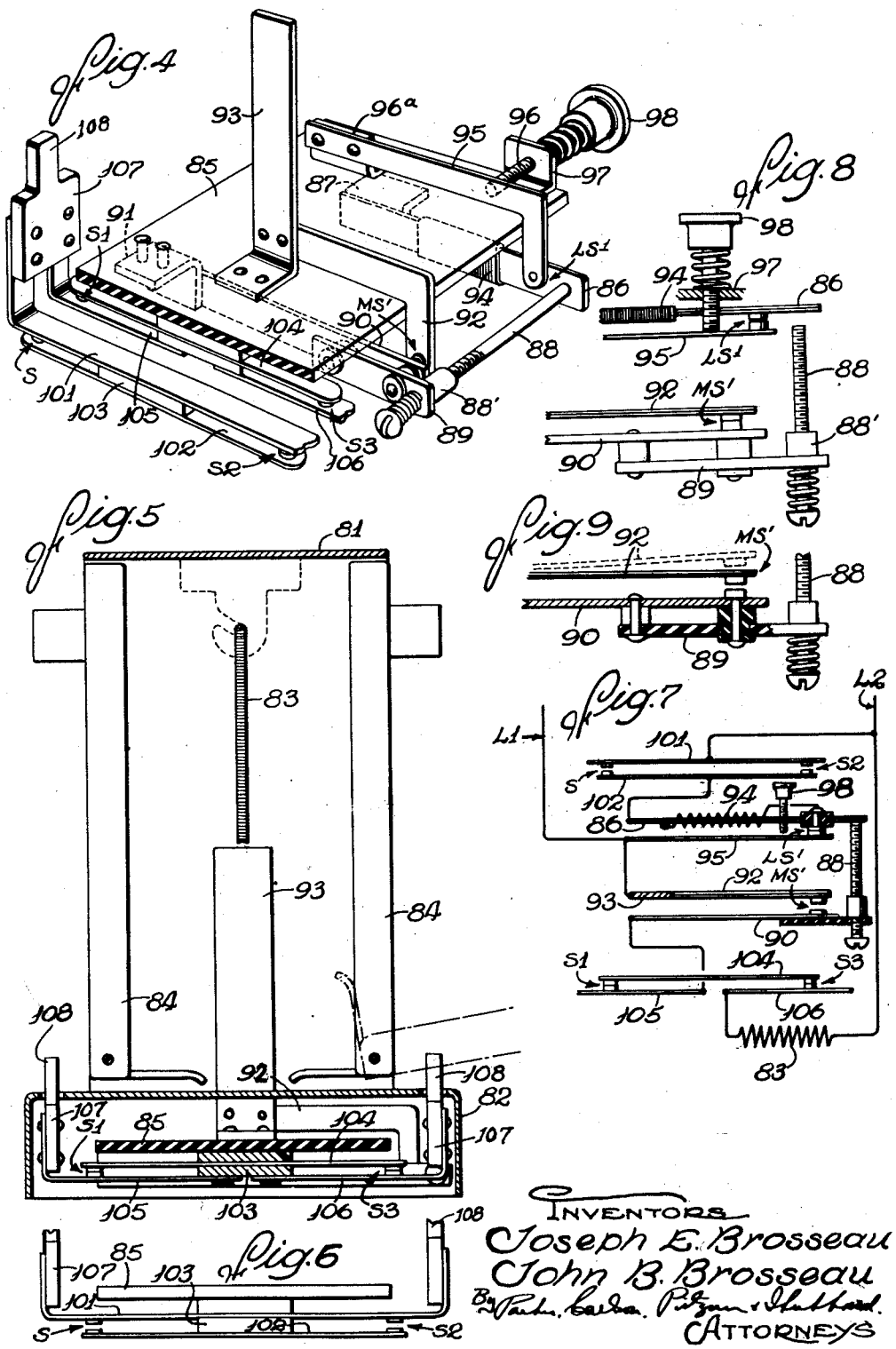

Patented June 1, 1943

2,320,347

UNITED STATES PATENT OFFICE 2,320,347

CONTROL DEVICE

Joseph E. Brosseau and John B. Brosseau,
West Chicago, Ill.

Application March 17, 1941, Serial No. 383,656

32 Claims. (Cl. 161—1)

The invention relates to control devices generally and more particularly to control devices for timing and controlling the operating periods of appliances or other apparatus intended for intermittent operation. This application is in part a continuation of our prior application Serial No. 303,352 filed November 8, 1939, now abandoned.

One object of the invention is to provide an improved control device of the thermally actuated type which has an extensive timing range, which is capable of functioning with a high degree of accuracy regardless of any variations in the rate at which heat is supplied thereto, and which is to a high degree independent of changes in ambient temperature.

Another object is to provide a novel thermal timer in which the timed interval is measured by the cooling of a thermally responsive member through a predetermined range having its lower limit substantially above the ambient temperature.

Another object is to provide an improved thermally actuated control device in which overheating of the thermally responsive element is effectually avoided thus materially prolonging the useful life of the element and insuring uniform accurate operation over long periods of use.

Control devices of the above general character are well suited for controlling appliances of the heating type as, for example, bread toasters or the like although, of course they are not limited to use with this particular type of appliance. In the case of toasters and similar appliances, the effectiveness in any given operating period varies according to the initial temperature of the toasting or heating chamber which is determined largely by the length of the inactive intervals between successive operating periods. Another object of the invention is to provide an improved control device for timing the operating periods of such appliances including means automatically operative to compensate for variations in the initial temperature of the heating chamber thus insuring uniform effectiveness in successive operating periods. This uniformity is attained in the present instance by varying the length of each operating period in accordance with the temperature of the heating chamber at the beginning of that period.

Another object is to provide an electrical control device of the thermally actuated type which is entirely independent of variations in the voltage of the operating current.

Still another object is to provide an improved control device of the above general character for controlling appliances heated either by gas or electricity.

It is also an object of the invention to provide an automatic, fully compensated control device of the above general character which is reliable and accurate in operation, substantially independent of variations in the rate of heat supply, and readily adjustable to meet a wide variety of operating conditions, yet extremely simple in construction and capable of being manufactured at relatively low cost.

Other objects and advantages of the invention will become apparent from the following detailed description of the preferred embodiments illustrated in the accompanying drawings in which:

Figure 1 is a perspective view of a gas heated toaster equipped with a control device embodying the features of the invention.

Fig. 2 is a fragmentary view of the timing and compensating elements of the control device shown in Fig. 1.

Fig. 3 is a fragmentary view showing a part of the door operating mechanism for the toaster and its relationship to certain elements of the control device.

Fig. 4 is a perspective view of a modified form of the control device adapted for installation in electric toasters.

Fig. 5 is a vertical sectional view of an electric toaster with the improved control device installed therein.

Fig. 6 is a detail view showing a part of the door operated switch forming a part of the control device.

Fig. 7 is a circuit diagram of the control device shown in Fig. 5.

Fig. 8 is a fragmentary view showing the timing element of the control device conditioned for operation.

Fig. 9 is a detail view of the compensating element showing its mode of operation.

Fig. 10 is a diagrammatic view of the control device as applied to an electrically operated game, the device being shown in an inactive condition.

Fig. 11 shows the starting mechanism of the above control device set to condition the device for a timing operation.

The objects above set forth are attained by constructing the timing device so that the timed interval is measured by the movement of a thermally responsive member on cooling from a predetermined initial temperature to a selected lower temperature both of which are substantially higher than the temperature of the medium surrounding the member. During non-timing intervals or for a substantial interval before each timing operation the initial temperature of the member is maintained substantially constant by intermittent application of heat thereto under control of regulatory means controlled by the position of the member, the arrangement being such that heat is applied when the temperature of the member falls below the predetermined initial value and the heating is interrupted when the temperature of the member exceeds that value. The timing operation is initiated by a substantial reduction or interruption of the heating, this being done by means independent of the regulatory means.

By utilizing the cooling cycle of the thermally responsive member in this manner, the control device is rendered substantially independent of the rate of heat supply. It is only necessary that the member receive sufficient heat to raise it to the desired initial temperature prior to the timing operation. Moreover, the heating interval is not critical and the member may be maintained indefinitely at the initial temperature without danger to the apparatus and without affecting the accuracy of the timing. This is particularly advantageous where the operating periods of the apparatus to be controlled are irregularly spaced as is usually the condition where such periods are initiated by manual control as for example, in toaster and other household appliances, pinball games, etc.

A further advantage obtained by utilizing the cooling cycle of the thermal member in the manner contemplated by the present invention is that the upper and lower limits of the effective cooling range can be set sufficiently above the ambient temperature to make the device substantially independent of temperature variations. Moreover, progressive lengthening or shortening of successive time intervals may be effected by simple control means to compensate for changes in the operating conditions of the apparatus being controlled. This is advantageous in the case of heating appliances such as toasters in which the residual heat varies in accordance with the intervals between successive operating periods. Thus the control device may be arranged for automatically effecting the necessary adjustments to insure uniform effectiveness of the appliance under widely varying operating conditions.

Referring now to Fig. 1 of the drawings, the improved control device is shown installed in a multiple slice toaster such as is commonly used in restaurants or the like. The toaster comprises generally a rectangular metal framework 10 forming a partially enclosed toasting chamber within which are disposed a series of flat heat radiating elements 11 usually of ceramic material. The elements 11 are spaced apart for the reception of elongated members 12 of a bread supporting rack which includes a front plate 13 serving as a door for the toasting chamber. The members 12 on which the individual slices of the bread to be toasted are placed are formed on or secured to the lower edge of the plate 13. The entire rack assembly is swingingly supported by a linkage including a rock shaft 14 extending longitudinally of the frame. Fast on the shaft are a series of radially projecting arms 15 pivotally connected to brackets 16 depending from the respective members 12. The arrangement is such that the bread slices resting on the rack may be moved into toasting position between the heating elements and withdrawn therefrom for convenient removal from the toaster by appropriate movement of the rack, the toasting chamber being closed by the door 13 when the bread is in position for toasting.

In the particular toaster illustrated, the heat radiating elements 11 are heated by a suitable source of heat, as for example, a gas burner (not shown) to which gas is supplied through a mixer 17 and valve V. The valve is desirably arranged for control by the door so as to cut down the supply of gas to the burner when the door is opened to withdraw the bread from the toasting chamber and to increase it to a predetermined maximum when the door is closed to insert the bread between the radiating elements. To this end, the shaft 14 which rocks along with the rack is provided with a rigid arm 18 yieldably connected by a coiled tension spring 19 with one arm of a pivoted bell crank 20, the other arm of which coacts with a rod 21 which constitutes an operator for the valve V. When the door is swung inwardly, the shaft 14 is rocked in a counterclockwise direction and the spring 19 is tensioned to shift the valve operator to valve opening position. As the rack is swung out of the toasting chamber, the shaft 14 is rocked to the position shown in the drawings whereupon a spring incorporated in the valve returns the operator 21 to its inactive position and partially closes the valve to reduce the flow of gas to the burner.

As herein shown, the bread rack is adapted to be swung between its inner and outer positions by rocking the shaft 14. The inward swinging or door closing operation is intended to be performed manually while the outward swinging or door opening operation may be either manual or automatic. For manual operation a starting member in the form of a lever 22, pivoted on the frame of the toaster and having its free end projecting beyond the front wall thereof, is connected by a link 23 with an arm 24 fast on the shaft 14. When the lever is depressed, the shaft is rocked in a counterclockwise direction to close the door. The door is held closed in any suitable manner as by a latch 25 adapted to engage a dog 26 carried on the end of the arm 24. The latch is carried in this instance on one end of a flexible spring member 27 the other end of which is anchored to a bracket 28ª on the frame of the toaster. The lower edge of the dog is tapered so that the latch is deflected on the downward movement of the arm 24. When the nose of the dog clears the latch, the spring returns it to latching position to hold the door closed.

To permit of manually opening the door, the lever 22 and link 23 are interconnected by a pin 28 operating in a slot 29 in the link. The slot is inclined with respect to the longitudinal axis of the link so that the lever, when raised, is effective to rock the link rearwardly. Secured to the link is a rigid finger 30 having at its free end a roller 31 which, in this movement, engages the flexible member 27 and forces the latch to the dotted line position shown in Fig. 3, thus freeing the dog and permitting the spring 19 to rock the shaft 14 toward door opening position. The tension of the spring is preferably just sufficient to move the door to an overcenter position, the weight of the door serving to continue the movement to fully open position.

To provide for automatic operation of the toaster, means is provided for withdrawing the latch under control of a device arranged to time successive operating periods. For this purpose, the flexible latch supporting member 27 is constructed in the form of a bimetallic strip adapted when heated to warp in a direction effective to withdraw the latch 25 from the path of the latch dog. As herein shown, heat is applied to the member by an electrically energized heating coil 32 wound thereon. The member and the coil thus constitute a thermal latch releasing relay operable automatically under control of the control device which will now be described.

In the form best suited for appliances of the type above described, the improved control device is constructed as two separate units, one including timing and compensating means and the other including latch releasing and switching means. These units are mounted in compartments formed in opposite ends of the frame as shown in Fig. 1, the units being positioned therein so as to be substantially unaffected by the heat of the toasting chamber. As shown in Figs. 1 and 2, the timing unit of the device includes a main timing element comprising a flexible strip 41, carrying the movable contact 42 of a switch MS hereinafter called the main control switch, the stationary contact 43 of which is carried by an elongated spring member 44. The strip 41 is secured to one end of a thermally responsive member 45, the latter being fixed at its lower end to a bracket 46 carried on the frame of the toaster and insulated therefrom. The spring member 44 is also insulated from the frame upon which it is mounted in an upright position so that the contact 43 is engageable by the contact 42 when the thermal member of the timing element is cold. In the present instance, the main control switch is arranged to control the latch heating coil 32 in cooperation with a door controlled switch DS which prepares the energizing circuit for the coil when the toaster door is closed.

The timing element is conditioned for operation by application of heat thereto during the inactive intervals between successive operating periods of the appliance. The heat warps the thermal member so as to move the contact 42 away from the contact 43, that is, it opens the main control switch MS. While the thermal member may be heated in any preferred manner, the particular device illustrated utilizes for this purpose an electrically energized heating coil 47 of relatively high resistance which, in this instance, is wound directly on the thermal member 45 for efficient operation. The coil is adapted to be energized in a circuit including a door controlled switch DS1 closed when the toaster door is open and a limit switch LS formed by a contact point 48 carried on a lug 49 (Fig. 1) projecting laterally from the spring element 41 and cooperating with a contact 50 carried on a spring member 51 extending generally parallel to the timing element. As herein shown, the switches DS and DS1 are actuated by a common operating member in the form of an L-shaped strip 51ª of insulating material carried on the arm 24 which, as above explained, swings with the bread rack in its movements between operating and idle positions.

The arrangement of the elements is such that when the coil 47 is heated, the free end of the thermal member 45 moves to the right as viewed in Fig. 2, thereby tending to open the switch LS and thus interrupt the circuit of the heating coil. Immediate opening of the switch is prevented by tensioning the spring member to follow the contact 48 until it engages a stop, herein shown as an elongated rod 52 having one end interposed in the path of the spring member. The position of the stop, therefore, determines the limit position of the timing element by regulating the point at which the circuit of the heating coil is opened to interrupt the heating of the thermal member 45. When the thermal member cools down slightly, the heater circuit is reclosed and heat is again applied to the thermal member. In this way, the member is maintained substantially at a constant elevated temperature with the timing element held at a limit position from which it can recede at a definite rate to perform its timing function. To vary the length of the timed interval, it is only necessary to adjust this limit position by shifting of the rod 52 axially. For this purpose the rod is screw threaded into a stationary bracket 52' and provided on its projecting outer end with the manual operator 53 by which it may be turned to effect the desired adjustments.

It will be apparent from the foregoing that the timing element is conditioned to perform its timing function by a preliminary application of heat, the amount of heat applied being determined by the setting of the adjustable stop. The timing element therefore floats at the limit position, intermittently opening and closing the heater circuit by movements too small to appreciably affect the timing.

The actual timing is performed in the cooling cycle of the element in which the heat previously applied thereto is dissipated. This cycle may be initiated in any suitable manner as by substantially reducing or completely interrupting the supply of heat to the thermal member coincident with the beginning of the operating period to be time. In the exemplary toaster, the cooling cycle is started by the opening of the switch DS1 upon closure of the door 13. When the timing element cools down to the lower limit temperature it marks the end of the timed interval. In this instance, contact 42 engages contact 43 to complete an energizing circuit for the latch heater 32 by way of the door controlled switch DS.

In order to compensate for variations in the initial temperature of the toasting chamber, means is provided for varying the position of the stationary switch contact 43 of the main control switch in accordance with such temperature. This means as shown in Figs. 1 and 2, comprises a thermal element 61 carried on a bracket 62 secured to the framework of the toaster. One end of the element is positioned either in or closely adjacent the toasting chamber so as to be affected by the heat thereof while the other end is provided with an adjustable screw 63 bearing against the back of the spring member 44. As the temperature of the chamber increases, the thermal element warps in a direction to shift the spring member and contact 43 toward the timing element whereby the point at which the switch contacts engage is advanced proportionately. As the toasting chamber cools, the thermal element returns toward its normal position, thus moving the spring member and contact farther from the timing element and increasing the time required to close the main control switch.

Gas heated toasters and other similar appliances having relatively large heating chambers require considerable time to reach the proper operating temperature when first started in operation. In order to avoid any interference with this preliminary heating, means is provided for temporarily disabling the automatic control device until the required operating temperature is attained. This is accomplished in the present instance by interrupting the current supply to the control device until the temperature of the heating chamber reaches a predetermined point. Such interruption is effected by a switch SS hereinafter called the starting switch, interposed in the operating circuit of the control device.

Referring to Figs. 1 and 3, switch SS, as herein shown, comprises a pair of spring members 71 and 72 having cooperating switch contacts normally held apart by the tension of the members. Mounted within the testing chamber or closely adjacent thereto, so as to respond to an increase of temperature therein, is a thermal element 73 having an adjustable switch engaging member 74 positioned to engage the spring member 72 when the thermal element is warped by heating. The thermal element and switch member are so adjusted that the switch SS is closed when the toaster reaches operating temperature, the thermal element acting to hold the switch closed as long as such temperature is maintained. Upon closure of the switch, current is supplied to the control device which then assumes control of the appliance.

In placing the toaster in operation, the door is closed by depression of the lever 22 which serves to open the gas valve V and thus admit gas to the burner which can then be lighted in the usual way. The control device is then connected to a suitable source of current by a cord comprising line conductors L1 and L2. The control device remains inactive at this time, however, as the starting switch SS is open due to the low temperature of the toasting chamber. When the toasting chamber reaches operating temperature, the thermal element 73 acts to close the switch SS, thereby completing a circuit from line conductor L1, closed door controlled switch DS, conductor C1, conductive strip 74ª, winding of the latch heating coil 32, then through the thermal element 27 and spring member 71 with which the element is electrically connected through the switch SS, spring member 72, and conductor C2 to switch member 44 of the main control switch MS. As the timing element of the control device is cold at this time, the switch MS is closed and the above circuit is extended by way of this switch, the timing element, and bracket 46 to line conductors L2. The latch releasing coil is thus energised and warps the latch support element and latch 25 out of the path of the latch dog 26 to release the door. The spring 19 accordingly swings the door open, thus indicating that the toaster is ready for operation.

As the door swings open, the switch DS is opened and switch DS1 is closed, thereby shifting the circuit from the latch releasing coil to the timer heating coil 47. The circuit for this coil may be traced from line conductor L1 through the closed switch DS1, conductor C3, spring member 51, limit switch LS which is closed when the timing element is cold, winding of coil 47 and then through the thermal member 45 and bracket 46 to line conductor L2. The latch releasing thermal element 27 cools down to position the latch for reengagement with the latch dog in the next operating period, while the timer heating coil 47 is energized to heat the thermal member 45 and thus warp the timing element in a direction to open the main switch MS. When the timing element reaches the limit position determined by the setting of the stop 52, limit switch LS is opened, thus momentarily interrupting the energization of the coil 47. The thermal element then cools down until the limit switch again closes to reenergize the coil and again move the timing element to switch opening position. Thus the timing element remains substantially in a fixed position as long as the door of the toaster remains open.

During this inactive period of the toaster, the attendant places the bread to be toasted on the supports 12 and then closes the door by depressing lever 22. This results in the opening of switch DS1 and the closure switch DS, thus interrupting the energizing circuit for the timing element heating coil 47 and preparing the circuit for the latch releasing coil 32. As the heat stored in the thermal member 45 is dissipated, the member gradually moves toward its initial position until the contact 42 engages contact 43, thus closing the main control switch to complete the previously described circuit for the latch releasing coil. The latter coil warps the latch releasing element to withdraw the latch and open the door, thus terminating the operating period of the toaster.

As the temperature of the toasting chamber increases in successive operating periods closely following one another, the increased initial temperature is reflected in the action of the compensating element 61 which moves the spring member 44 toward the timing element thus automatically decreasing the length of the operating period indicated by the setting of the stop 52. In case the toaster is inactive for an interval sufficient to permit substantial cooling of the toasting chamber, the compensating element 61 responds by moving the element 44 away from the timing element so that the succeeding operating period is increased proportionately. In this way the toaster is automatically regulated to act with uniform effectiveness in each operating period regardless of the length of the inactive intervals between such periods. As a result, the toaster is enabled to produce uniformly brown toast under any operating conditions.

The modified control device shown in Fig. 4 operates on the same general principle as the device hereinbefore described but is designed for use in household appliances such as electrically heated toasters. By way of illustration, the control device is shown as applied to a toaster having an upright frame 81 mounted on a hollow metal base 82. Supported centrally within the frame is the usual heating element 83 defining a pair of outwardly facing toasting chambers each having at its open side a pivoted bread rack 84. As is well known, each rack holds a slice of bread and when swung to the closed position shown in Fig. 5, presents one side of the slice in operative relation to the heating element. The racks may be swung outwardly to the position shown in dotted line in Fig. 5 for turning or removing the bread slices.

In the particular environment shown, the control device is automatically conditioned for operation when either or both of the bread racks are swung out for loading, turning or removing bread slices thereon. Closure of the racks to present the bread slices to the heating element automatically initiates the operating period of the appliance and, at the same instant, starts the timing cycle of the control device. As in the previously described device, the actual timing is effected in the cooling cycle of a thermally responsive member from a predetermined elevated temperature, the member being maintained substantially at that temperature by intermittent application of heat thereto in the inactive intervals of the appliance.

The control device is preferably assembled as a unit for convenient mounting in the hollow base 82 of the toaster. As herein shown, the various parts of the device are supported on a rectangular mounting block 85 of fibre or other suitable insulating material adapted to be bolted or otherwise rigidly secured to the base. The parts so assembled include a main timing element 86 herein shown as a thermally responsive bimetallic strip anchored at one end to a bracket 87 secured to the under side of the mounting block. The timing element is arranged to co-operate with a switch operating member 88 herein shown as an elongated bolt threaded into a sleeve 88' welded or otherwise suitably secured to a flat metal strip 89 rigid with but insulated from a spring member 90 which carries the movable contact of a main control switch MS'. The spring 90 is fixed to the under side of the block 85 by means of a bracket 91 so as to extend generally parallel to the timing element.

As herein shown, the stationary contact of the main control switch MS' is carried at one end of a thermally responsive member such as a bimetallic strip 92 which is fixed at its other end to an elongated upright metal strip 93 of heat conducting material. The heat conducting strip is supported on the block 85 in a manner such that when the device is assembled with the toaster, the strip projects into the toasting chamber to conduct heat therefrom to the thermally responsive element 92. The latter member thus constitutes a compensating member adapted to be positioned variably in accordance with the temperature of the toasting chamber the arrangement in the present instance being such that as the temperature increases the element moves to the right (as viewed in Fig. 4) or upwardly toward the dotted line position shown in Fig. 9 to advance the point at which the switch contacts of the main switch MS' open and close.

The timing element 86, as herein shown, is arranged to engage the switch operator 88 and open the main switch MS' when cold (as shown in Fig. 7) and to warp upwardly and permit closure of the main switch when heated (as shown shown in Fig. 8). The element is thus conditioned for timing the closed period of the main control switch by application of heat thereto, in this instance by a heating coil 94 wound directly on the element, the coil preferably having a relatively high resistance to reduce current consumption to a minimum.

As in the previously described control device the limit position of the timing element is controlled by a limit switch LS', one contact of which is carried by the timing element and the other by a tensioned spring member 95 secured to the upper surface of the block 85 by a bracket 96ª. The spring 95 is tensioned to follow the timing element in its movement toward operated position until such movement is interrupted by an adjustable stop 96 in the form of a screw threaded into a bracket 97 rigid with the block 85. A knob 98 at the end of the screw is provided for adjusting the position of the stop to accurately define the limit position of the timing element and thus determine the point from which the element begins its cooling cycle. The switch LS' is connected in the circuit of the timer heating coil 94, and the adjusting screw therefore regulates the amount of heat applied to the timing element to condition it for the timing operation. Since the timing operation is effected in the cooling cycle of the element the accuracy of the device is entirely independent of variations in the voltage of the current supplied to the control device. Moreover, by setting the initial and switch actuating temperature limits well above ambient temperature, the device can be made substantially independent of changes in ambient temperature.

The operation of the control device may be initiated in any suitable way. In the particular toaster illustrated, the device is arranged for control automatically as an incident to the manipulation of the bread racks to load and unload the toaster. Thus when either bread rack is swung out to receive a fresh slice of bread, the timer heating coil is connected in circuit to condition the timing element for operation. When the break racks are returned to operative position, the operating cycle is automatically initiated, current being supplied to the main heating element of the appliance and coincident therewith heating of the timing element is interrupted. At the end of the predetermined time for which the toaster is set as determined by the adjustable stop 96, the timing element opens the main switch MS' to terminate the operating period and the toaster remains idle until another cycle is initiated by manipulation of the bread racks as above explained.

The means provided for initiating an operating cycle, as herein shown, comprises suitable electrical switches associated with the bread racks and adapted to be actuated by the weight of these elements of the toaster. As shown in Figs. 4–6, two switches are provided for each track. For the left hand rack there is a switch S and a switch S1, the first being open and the latter closed when the rack is swung to the operative position shown in the drawings and reversed when the rack is swung to the open or dotted line position. Similar switches S2 and S3 are provided for the right hand rack.

As will be seen by reference to Fig. 6, the switches S and S2 are formed by common spring members 101 and 102 extending transversely of the mounting block 85 and carried on an insulated bracket 103 mounted on the under side of the block. Switches S1 and S3 include a common spring member 104 (Fig. 5) and individual spring members 105 and 106. The spring members 101, 105 and 106 are extended beyond the lateral edges of the block 85 and the projecting end portions are bent upwardly and secured to a common operating member 107 of insulating material. Each operating member has a tip 108 projecting through an aperture in the base of the toaster closely adjacent one of the bread racks. When a rack is opened to the dotted line position, it engages and depressed the associated operator and thus actuates the companion switches. When the rack is closed the switches assume their normal position.

The toaster is provided with the usual cord comprising the conductors L1 and L2 by which it may be connected with a source of current. No action takes place, however, due to the main switch MS' being open, until at least one of the bread racks is swung out to receive a slice of bread. When the left hand rack is opened, for example, the switch S1 is opened to interrupt the circuit of the main heating element of the appliance and switch S is closed. The latter completes a circuit from the line conductor L2 through the timer heating coil 94 and limit switch LS' to line conductor L1. The heating coil is thus energized and acts to heat the timing element to condition it for the timing operation.

The application of heat to the timing element 86 causes it to warp away from the switch operator 88 as shown in Fig. 8. When the element reaches the predetermined elevated temperature necessary to produce an operating period of the desired length as indicated by the setting of the stop 96, the limit switch LS' interrupts the circuit of the heater. The timing element thus "floats" at the predetermined limit position as before explained. Accordingly, as long as either bread rack remains in its open or withdrawn position, the timing element is held at the desired predetermined temperature.

When both bread racks are now swung to closed position, switches S and S2 open to interrupt the circuit for the heating coil 94 and switches S1 and S3 close to complete the circuit for the main heating element. This latter circuit may be traced from the line conductor L2 through the heating element 83, switches S3 and S1 in series, and main switch MS' to line conductor L1. By arranging the switches S1 and S3 in series in this manner, energization of the main heating element is prevented until both toasting racks are closed.

When the circuit of the heating element 94 is opened, application of heat to the timing element is interrupted and the element starts to cool. As the heat of the element is dissipated, it returns toward its original or cold position. After a predetermined interval, the element engages the switch operator 88 and thus opens the main switch MS'. The main switch interrupts the circuit for the main heating element and terminates the operating period of the appliance. The switch MS' remains open and the appliance is shut off until a new operating cycle is initiated by manipulation of the bread racks as above explained.

Under ordinary operating conditions, the residual heat of the toaster gradually increases in successive operating periods until a substantially constant maximum temperature is reached. This increase is not always uniform but depends upon the length of the idle intervals between operating period. In general, however, the initial temperature of the toasting chamber at the beginning of a toasting period may vary substantially from one period to the next. Compensation for this temperature variation is effected automatically by warping of the compensating element 92 to which heat is carried by the heat conducting strip 93. As the temperature of the toasting chamber increases, the element 92 is warped upwardly as indicated by the dotted lines in Fig. 9, thus advancing the position of the main switch contacts so that the time required for the timing element to open the switch is decreased. If the appliance is idle for a substantial length of time, the toasting chamber cools and the compensating element returns to the position shown in full lines in Fig. 9 so that the succeeding operating period is proportionately increased. Thus, without any attention on the part of the operator, the toasting or operating periods of the appliance are increased or decreased in accordance with the initial temperature of the toasting chamber so that the effectiveness of the appliance is uniform in each successive cycle.

Figs. 10 and 11 show the manner in which the improved control device may be incorporated in electrically operated game apparatus of the type having a series of movable elements or projectiles such as balls 110 and means for projecting them in succession onto an inclined playing surface 111 arranged to direct the balls over random paths as they roll down the surface into a collecting pocket 112. As is well known, such games are provided with electrical switches disposed along the paths followed by the balls and adapted to be actuated by a passage of a ball to operate a score register or counter. The above apparatus and other electrical devices incorporated in the game must be supplied with current when the game is in use and it is desirable to continue the supply of current for a definite interval after each period of use to allow the score to be totalled or checked by an attendant or other person. If the game is not reused immediately, the current supply may be interrupted to avoid unnecessary consumption of current. In this environment the control device is arranged to time the interval for continued current supply and to shut off the current when it is no longer required.

In the particular game apparatus selected to illustrate the invention, the electrical instrumentalities are supplied with current from the secondary winding 113 of a transformer T by way of conductors 114 individually fused as at 115. A flexible cord comprising conductors 116 and 117 terminating in a plug P provides means for connecting primary winding 118 of the transformer to a conventional electrical outlet. As herein shown the cord conductor 116 is connected directly to one terminal of the transformer primary while the other conductor 117 is extended by way of a fuse 119 and a branch conductor 120 to a spring member 121 which carries one contact of a main control switch MS''. The other contact of the control switch is carried on a spring member 122 connected by a conductor 123 with the other terminal of the transformer primary. In the particular embodiment illustrated a lamp L is connected in parallel with the transformer for lighting the playing surface. With this arrangement the current supply circuit for the transformer and the lamp may be opened or closed as required by actuation of the main control switch.

For actuating the main control switch MS'' there is provided a timing element in the form of a thermally responsive bimetallic member 125 supported at one end on a block 126 of insulating material which also supports the spring members 121 and 122. When the thermal member is heated, the free end is warped upwardly as viewed in Fig. 10 and, through the medium of an insulating bushing 127 coacting with a similar bushing 128 on the spring member 122, closes the main control switch. Upon cooling, the strip returns to the normal position shown in Fig. 10 allowing the main switch to open by reason of the tensioning of the spring member 122. The point at which the switch is opened and closed is determined in this instance by an adjustable stop comprising a screw 129 threaded into a stationary part of the framework of the apparatus and arranged to coact with a strip 130 of insulating material rigidly attached to the free end of the spring member 121.

As in the case of the control device arrangements previously described, the thermally responsive member 125 is conditioned for a timing operation by heating it to and maintaining it at an approximately constant predetermined elevated temperature substantially above the ambient temperature. Heat is applied to the member by a suitable heater herein shown as an electrical heating coil 131 which may be wound on or located closely adjacent the strip. The operation of this coil is controlled in part by a limit switch LS'', one contact of which is carried by the member 125 and the other by a spring member 132 tensioned to follow the first member in its movements toward operated position.

The following movement of the member 132 is interrupted by engagement with an adjustable stop screw 133 threaded into the stationary framework of the apparatus and having one end disposed in the path of an insulating strip 134 fixed to the free end of the member. The switch LS'' upon opening, interrupts the application of heat to the thermal member. When the member cools down sufficiently to reclose the limit switch, the heating coil is reenergized. In this way the thermal member is automatically maintained substantially at the desired elevated temperature by the intermittent application of heat thereto. When at this temperature and in cooling through a substantial range therefrom, the member maintains the main control switch closed and the game apparatus in operative condition. The cooling range represents the timed interval and may be varied within wide limits by appropriate adjustments of the screws 129 and 133. For any such adjustment or setting however, the interval will be timed with a high degree of accuracy regardless of the variations of the voltage of the current supplied to the apparatus.

While the thermally responsive member 125 may be maintained at the elevated conditioning temperature continuously without detrimental effects, it is preferred to condition the member for the timing operation only when the game apparatus is actually in use. To this end, means is provided for automatically energizing the heating coil as an incident to the apparatus being placed in use and for initiating the timing operation upon the completion of a period of use.

The particular apparatus shown by way of illustration is arranged to utilize the movable elements or balls 110 for controlling the timing cycle of the control device. As is well known, in games of the character under discussion the balls 110 are held in the collecting pocket 112 when the game is idle. To place the game in use the balls are released by manipulation of a manually operable slide 136 or the like which permits the balls to gravitate into an inclined delivery chute 137 from which they are removed one by one in well known manner for presentation to the projecting mechanism.

Pivoted at one end on the under side of the chute is an elongated lightweight metal tongue 138 arranged to extend through a longitudinal slot 139 in the bottom of the chute. The free end of the tongue rests on a vertical rod 140 of insulating material carried by a spring member 141 normally operative to hold the tongue in the elevated position shown in Fig. 10 but adapted to yield under the weight of a ball and permit the tongue to move to the position shown in Fig. 11. The spring member 141 carries one contact of a switch S4 the other contact of which is carried by a spring member 142 disposed below the first mentioned spring member. A second contact on the member 142 cooperates with a contact on a spring member 143 to form a switch S5. The arrangement is such that both switches are open when the chute is empty (as shown in Fig. 10) and both are closed by the admission of one or more balls to the chute (as shown in Fig. 11).

In the particular circuit organization illustrated, switch S4, limit switch LS'' and the timer heating coil 131 are connected in series across the supply cord conductors by branch conductors 144, 145 and 146 whereby the coil is energized under control of the limit switch when one or more balls 110 are in the chute 137. Switch S5 is connected in parallel with the main control switch MS'' by conductors 146 and 147. Accordingly, the arrival of the first ball in the chute is effective to complete the current supply circuit for the transformer T and lamp L so that the game can be used without delay. In the meantime the coil 131 quickly heats the thermal member to the conditioning temperature thereby closing the main switch MS'' and thus completing an auxiliary supply circuit for the transformer.

As the tongue 138 is freed by the withdrawal of the last ball from the chute, switch S4 opens to start the timing operation by interrupting the current supply for the heating coil 131. At the same time switch S5 opens to remove the shunt from around the main control switch S'' whereby the latter is placed in complete control of the apparatus. After a definite interval of cooling the thermal member 125 opens the main control switch as above explained and shuts off all current from the apparatus.

It will be apparent from the foregoing that the invention provides a novel thermally actuated control device of general utility. By reason of the novel arrangement whereby the timing operation is performed in the cooling cycle of a thermally responsive member the device is enabled to operate with a high degree of accuracy regardless of variations in the rate at which heat is supplied to the member. In the case of electrical appliances the device is thus rendered completely independent of variation in the voltage of the current supplied thereto. The thermal member is conditioned for its timing operation by intermittent application of heat thereto, such application being automatically regulated so as to maintain the member substantially at a constant elevated temperature for an indefinite period. Moreover, the regulating means may be adjusted within wide limits to vary the length of the operating period to be timed. The control device is of simple construction, easy to adjust and not likely to get out of order. Moreover, the adjustments are not critical because of the independence of the device from the numerous variable factors encountered in actual use.

In one form, the improved control device is particularly suitable for appliances of the heating type such as bread toasters or the like and when incorporated in such appliances is provided with means for automatically compensating for changes in the initial temperature of the toasting or heating chamber. Through the medium of this automatic compensation, uniform effectiveness of the appliance is maintained under substantially all operating conditions.

We claim as our invention:

1. A control device for intermittently operable appliances comprising, in combination, a thermally responsive element, means for applying heat to said element in each inactive period of the appliance, adjustable means for limiting the amount of heat applied to said element to determine the interval required to cool the element to a predetermined temperature, manually operable means for interrupting the heating of said element and simultaneously initiating the operating period to be timed, and means controlled by said element on cooling down to said predetermined temperature for terminating the operating period.

2. The combination with an appliance having a heating chamber closed by a hinged door and heating means for the chamber operative when the door is closed and inoperative when the door is open, of a control device including a thermally responsive element, an electrical heating coil for said element, a circuit adapted to be closed for energizing said coil to heat the element when said door is opened, said circuit being opened to interrupt the heating of the element when the door is closed, and means controlled by said element upon the dissipation of the heat applied thereto by said coil for automatically opening said door to terminate an operating period of the appliance.

3. A control device for an appliance having an electric heating element, said device comprising, in combination, a switch for opening and closing the circuit of said heating element, a thermally responsive timing element operative when cold to open said switch and when heated to permit the switch to close and thereby energize the heating element, means for applying heat to said timing element during an inactive interval of the appliance, and manually operable means for initiating the operating periods of the appliance and for interrupting the heating of the timing element coincident with the beginning of each operating period, said timing element acting to open said switch and deenergize the heating element of the appliance upon cooling down to a predetermined temperature.

4. The combination with a toaster having an electric heating element and a pair of bread racks pivoted on opposite sides thereof for holding bread to be toasted, an energizing circuit for the electric heating element, a control device comprising a thermally responsive timing element adapted to be conditioned for timing the operating period of the toaster by preliminary heating in an inactive interval, means responsive to the tilting of either of said racks to remove the bread from the vicinity of the electric heating element for applying heat to said timing element to condition it for a timing operation, and means operative only upon closure of both of said racks for closing the circuit for said electric heating element to start an operating period of the toaster and for interrupting the heating of said timing element to initiate the timing operation of the element.

5. A control device for an intermittently operable appliance having a heating chamber comprising, in combination, a thermally responsive timing element, a compensating element variably positioned in accordance with the temperature of the chamber, a heater operative between operating periods of the appliance for applying heat to the timing element to condition it for timing the succeeding operating period, means controlled by the timing element for limiting the amount of heat applied thereto, manually operable means for initiating an operating period of the appliance and for simultaneously interrupting the operation of said heater, and means controlled by said timing element in cooperation with said compensating element upon the dissipation of the heat generated by said heater for terminating said operating period.

6. A control device for an appliance having an electrically heated element and an energizing circuit therefore comprising, in combination, a main control switch in the circuit for controlling the current supply for said element, a thermally responsive timing element operable at a predetermined temperature to open said switch, a heater for said thermal element, a circuit for the heater, manually operable switch means for opening the circuit for said element and for closing the circuit for said heater, said heater acting to heat the timing element substantially above said predetermined temperature thereby effecting closure of said main control switch, said switch means being operable to initiate an operating period of the appliance by closing the circuit for said element and simultaneously opening the circuit for said heater to interrupt the heating of the timing element, the timing element on cooling down to said predetermined temperature acting to open said main control switch to terminate the operating period of the appliance.

7. An electrical control device for a toaster having a heated toasting chamber and a bread rack movable into and out of toasting position with respect to said chamber, said device comprising, in combination, a pair of switches actuated by said rack, one switch being open and the other closed when the rack is in toasting position, said one switch being closed and the other switch being open when the rack is out of toasting position, a control circuit for the toaster including said other switch and a main control switch, a thermally responsive timing element for actuating said main control switch, a heater for conditioning said timing element to open said main control switch after a predetermined interval, and an energizing circuit for said heater including said one switch.

8. An electrical control device for toasters or the like comprising, in combination, a thermally responsive timing element, a heating coil operative when energized to heat said element, an energizing circuit for the coil, switch means operative to close said circuit during each inactive period of the toaster to heat the element and thereby condition it for timing the succeeding operating period, said switch means being operative to open the circuit and interrupt the heating of the element at the beginning of the operating period of the toaster so as to initiate the timing operation of the element, means in said circuit controlled by the timing element for limiting the amount of heat applied thereto irrespective of the length of the inactive period of the toaster to determine the interval required for the element to cool to a predetermined temperature, and a switch closed by the timing element upon cooling to said predetermined temperature for terminating the operating period of the toaster.

9. A control device for toasters or the like comprising, in combination a thermally responsive element, means for applying heat to said element in each inactive period of the toaster to condition the element for timing the succeeding operating period, means for limiting the temperature to which said element may be heated, means operable to adjust said limiting means to selectively vary the limit temperature of the element and thereby regulate the interval required to cool the same to a predetermined lower temperature, manually operable means for placing the toaster in operation and for simultaneously interrupting the heating of said element, and means controlled by said element on cooling down to said predetermined lower temperature for terminating the operation of the toaster.

10. A control device for toasters or the like comprising, in combination, a thermally responsive timing element, means for heating said element to a substantially constant temperature level during the inactive intervals of the toaster, means for interrupting the heating of the element when the toaster is placed in operation, means invariably actuated by said element upon cooling down from said constant temperature level to a predetermined lower temperature level for terminating the operation of the toaster, and manually operable means for selectively varying said constant temperature level to regulate the operating intervals of the toaster.

11. The combination with a toaster or the like having a heated chamber, of a control device including a thermally responsive timing element for timing the operating periods of the toaster, a heating coil operative when energized to heat said element to condition it for a timing operation, an energizing circuit for said heating coil, means operable to close said circuit and energize the coil during each inactive period of the toaster, means in the circuit actuated by said element for limiting the temperature to which the element may be heated irrespective of the length of the inactive period of the toaster, manually operable means for placing the toaster in operation and for simultaneously initiating the timing operation by opening said circuit to interrupt the heating of the timing element, said element on cooling acting to interrupt the operation of the toaster, and means operative to prevent the closure of the circuit for said heating coil when the temperature of the chamber falls below a predetermined level.

12. Control mechanism for intermittently operable appliances comprising, in combination, a starting member movable into an active position to place the appliance in operation and into an inactive position to terminate such operation, means yieldably urging said member to its inactive position, manually operable means for moving the member into its active position, latch means operative to hold the member in its active position, a thermally responsive timing element, means operative when said member is in its inactive position for applying heat to said element to condition it for a timing operation, means actuated by said member upon its movement to active position for interrupting the application of heat to the element, and means operated by said element upon cooling for withdrawing said latch means to release the member for return to inactive position.

13. Control mechanism for intermittently operable appliances comprising, in combination, a starting member movable into an active position to place the appliance in operation and into an inactive position to terminate such operation, means yieldably urging said member to its inactive position, manually operable means for moving the member into its active position, latch means operative to hold the member in its active position, a thermally responsive timing element, a heating coil operative when energized to heat said element, an energizing circuit for said coil including a switch, means associated with said member operative when the member is in its inactive position to close the switch for energizing said coil to thereby condition the timing element for a timing operation, said switch opening upon movement of the member to active position to deenergize said coil and thus initiate cooling of the timing element, and means operated by said element upon cooling to a predetermined temperature for withdrawing said latch means to release said member for return to its inactive position.

14. A control device for intermittently operable appliances comprising, in combination, a thermally responsive element, means for applying heat to said element in an inactive period of the appliance, means for limiting the temperature to which the element may be heated to determine the interval required for it to cool to a predetermined lower temperature, a starting member operable to place the appliance in operation and to simultaneously interrupt the application of heat to said element, means for maintaining said starting member in operated position, and means operated by said timing element on cooling to said predetermined lower temperature for releasing said starting member to terminate the operating period of the appliance.

15. The combination with a control device to be operated, of a timer comprising, a thermally responsive member adapted to move in one direction when heated and to return toward its initial position on cooling, means for conditioning said member for a timing operation including a heater operatively associated with the member, said heater being automatically controlled to maintain the member at a substantially constant elevated temperature, and means for interrupting the operation of said heater to initiate a timing operation, said member acting to operate the control device upon cooling down a definite amount from said substantially constant temperature.

16. The combination with a control switch, of a timer comprising, a thermally responsive member adapted to move in one direction when heated and to return toward its initial position on cooling, means for maintaining said member substantially at a predetermined elevated temperature to condition it for a timing operation, said conditioning means including an electrical heater for the member, a circuit for energizing the heater, a switch actuated by said member to open or close said circuit when the member reaches or falls below said predetermined temperature, and other switch means for interrupting said circuit to initiate a timing operation of the member, said member being operative to actuate the control switch a predetermined time after said circuit is interrupted by said other switch means.

17. The combination with a control device, of a timer comprising, a thermally responsive member adapted to move in one direction when heated and in the opposite direction on cooling, means for maintaining said member substantially at a predetermined limit position to condition it for a timing operation, said conditioning means including means for heating the member, means controlled by the member for interrupting the operation of said heating means when the member moves beyond said limit position in one direction and for reinitiating the operation of the heating means when the member moves beyond said limit position in the opposite direction, and other means for controlling the operation of said heating means to initiate a timing operation, said member being operative to actuate the control device upon moving a predetermined distance from the limit position in said opposite direction.

18. An electrical control device comprising, in combination, a main control switch, a thermally responsive member for actuating said switch, an electrical heater for said member including a normally closed limit switch, means operative to open said limit switch and interrupt the energization of said heater upon movement of the member beyond a limit position, said member being maintained substantially at said limit position by alternate opening and closing of the limit switch, and other means for opening the heater circuit to interrupt the application of heat to said member, said member on cooling down receding from said limit position to actuate said control switch after a predetermined interval.

19. An electrical control device comprising, in combination, a thermally responsive timing member, means for maintaining said member in a heated condition including an electrical heater, a circuit for energizing said heater, a switch in said circuit having a pair of switch contacts one of which is carried by said member, a spring member carrying the other of said switch contacts, said spring member being tensioned to follow the movements of the timing member when the latter is heated, and an adjustable stop engageable by said spring member to effect a separation of said switch contacts upon movement of the timing member beyond a predetermined limit position, said switch contacts on opening acting to interrupt the energization of said heater and thereby initiate a return movement of the timing element to said limit position.

20. An electrical control device comprising, in combination, a control switch, a thermally responsive timing member movable between hot and cold positions, means actuated by said member upon moving away from the cold position to close said control switch, means for maintaining said member substantially at the hot position including an electric heater, an energizing circuit for said heater, a switch controlling said energizing circuit including a pair of contacts, one of which is carried by said member, a spring carrying the other of said switch contacts, said spring being tensioned to follow the movements of said member toward the hot position to maintain the switch contacts in circuit closing engagement, a stop cooperating with said spring to separate said switch contacts and thereby open the heater energizing circuit upon movement of said member beyond the hot position, and other means for opening the heater energizing circuit to initiate the return of said member to the cold position for opening said control switch.

21. A thermally actuated timing device comprising, in combination, an elongated bimetallic strip anchored at one end and having the other end free to move when the strip is heated or cooled, an electric heater for said strip, a circuit for energizing said heater to maintain the strip at a predetermined elevated temperature to condition it for a timing operation, said circuit including a pair of switch contacts one of which is movable with the free end of said strip, a spring member carrying the other of said contacts and tensioned to follow the movements of said one contact when the strip is heated, a stop positioned to interrupt the movement of said member and open the heater energizing circuit only when the temperature of the strip exceeds said predetermined temperature, a normally open control switch arranged to be closed in the initial movement of the strip upon the application of heat thereto and to remain closed while the strip is at said predetermined temperature, and means for opening the heater energizing circuit to initiate a timing operation of the device, said strip operating to open said control switch after a definite interval of cooling from said predetermined temperature.

22. A control device for electrically operated apparatus having a movable member adapted to occupy one position when the apparatus is initially placed in use and a different position at the end of the period of use, said control device comprising, in combination, a switch for controlling the current supply for the apparatus, a thermally responsive timing element operative when heated to and above a predetermined temperature to close said switch, said element operating upon cooling below said predetermined temperature to open the switch, a heater associated with said timing element, means operative in response to the movement of the member into the out of said one position for initiating and interrupting the operation of said heater, and other means for intermittently interrupting the operation of said heater to maintain the timing element at an approximately constant temperature substantially above said predetermined temperature while the movable member occupies said one position.

23. A control device for a game apparatus having electrical devices actuated by a group of balls projected successively onto an inclined playing surface, said control device comprising in combination, a switch controlling the supply of current for the electrical devices, a thermally responsive timing element for actuating said switch, a heater for said element, means actuated in response to the movement of the balls into position for projection for initiating the operation of said heater and for interrupting the operation of the heater when the last ball of the group is projected, and other means for intermittently interrupting the operation of the heater to maintain the timing element at an approximately constant elevated temperature, said element acting to maintain said switch closed while at said elevated temperature and while cooling through a definite range following the interruption of heater operation by said ball actuated means.

24. A control device having, in combination, a thermally responsive timing member arranged to perform a timing operation in cooling through a definite temperature range having a lower limit substantially above the ambient temperature, means for intermittently applying heat to the member to maintain it indefinitely at the upper limit of said temperature range, and means for modifying the action of the heat applying means on said member to effect a gradual cooling of the member from the upper limit to the lower limit of said range.

25. A control device having, in combination, a thermally responsive timing member arranged to perform a timing operation in cooling through a definite temperature range having a lower limit substantially above the ambient temperature, heating means associated with said member, control means for said heating means operative to maintain said member indefinitely at the upper limit of said temperature range, and other control means for modifying the action of the heating means on said member to effect a gradual cooling of the member from the upper limit to the lower limit of said range.

26. A thermal timer comprising, in combination, a thermally responsive member, a control device arranged for actuation by said member, said device being maintained in one position while the member is cooling through a definite temperature range both limits of which are substantially above the ambient temperature and operated to an alternate position for marking the end of a timed interval when the member reaches the lower limit of said temperature range, heating means associated with said member, control means for said heating means operative automatically to maintain the member indefinitely at the upper limit of said temperature range, and means for modifying the action of the heating means to effect a gradual cooling of the member through said temperature range.

27. A timing device comprising, in combination, a thermally resonsive timing element, means operative to apply heat to said element to heat it to and maintain it at a selected elevated temperature substantially above the ambient temperature, and means operable to interrupt the application of heat to the element at the beginning of an interval to be timed, said element marking the end of the timed interval upon cooling from said selected temperature to a predetermined lower temperature also above the ambient temperature.

28. A timing device comprising, in combination, a thermally responsive timing element, means operable to apply heat to said element to heat it to and maintain it at a predetermined elevated temperature substantially above the ambient temperature, means adjustable to selectively vary said predetermined temperature, and means operable to interrupt the application of heat to said element to mark the beginning of an interval to be timed, said element acting to mark the end of the timed interval upon cooling to a temperature lower than said predetermined temperature but above the ambient temperature, the setting of said adjustable means determining the length of the timed interval.

29. A timing device comprising, in combination, a thermally responsive timing element, means operable to apply heat to said element to heat it to and maintain it at a predetermined elevated temperature substantially above the ambient temperature, means operable to interrupt the application of heat to said element to mark the beginning of an interval to be timed, said element acting to mark the end of the timed interval upon cooling to a temperature lower than said predetermined temperature but above the ambient temperature, and means cooperating with said element and adapted to be adjusted automatically in accordance with changes in the ambient temperature to vary the length of the timed interval.

30. A timing device comprising, in combination, a thermally responsive timing element, means for applying heat to said element, adjustable means controlling said heat applying means to determine the maximum temperature of said element, means for interrupting the application of heat to said element to initiate cooling of the element, and means for utilizing the cooling period only of the element to determine the length of an interval to be timed.

31. The method of timing which comprises applying heat to a thermally responsive element, regulating the application of heat so as to maintain the element at a predetermined selected temperature, interrupting the application of heat to the element to mark the beginning of the interval to be timed, and utilizing the cooling period only of the element to determine the length of the interval.

32. The method of timing which comprises applying heat to a thermally responsive element to heat the element to and maintain it at a selected elevated temperature substantially above the ambient temperature, interrupting the application of heat to the element to mark the beginning of the interval to be timed, and marking the end of the interval by the cooling of the element to a predetermined temperature lower than said selected temperature but higher than the ambient temperature.

JOSEPH E. BROSSEAU.
JOHN B. BROSSEAU.